Nov. 6, 1934.  E. H. P. YOUNG  1,980,128
DRIP FEED DEVICE
Filed Sept. 21, 1931
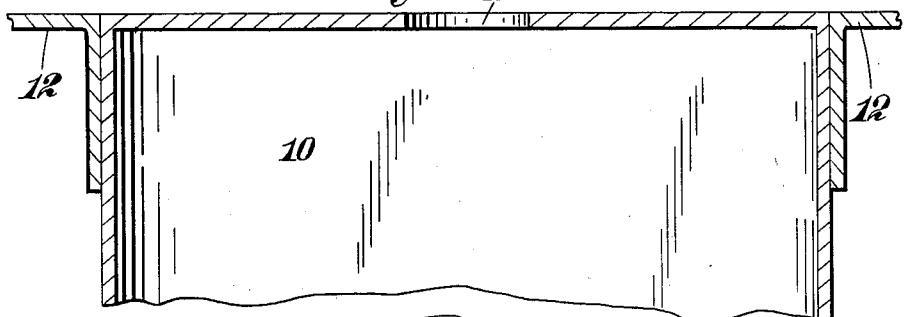
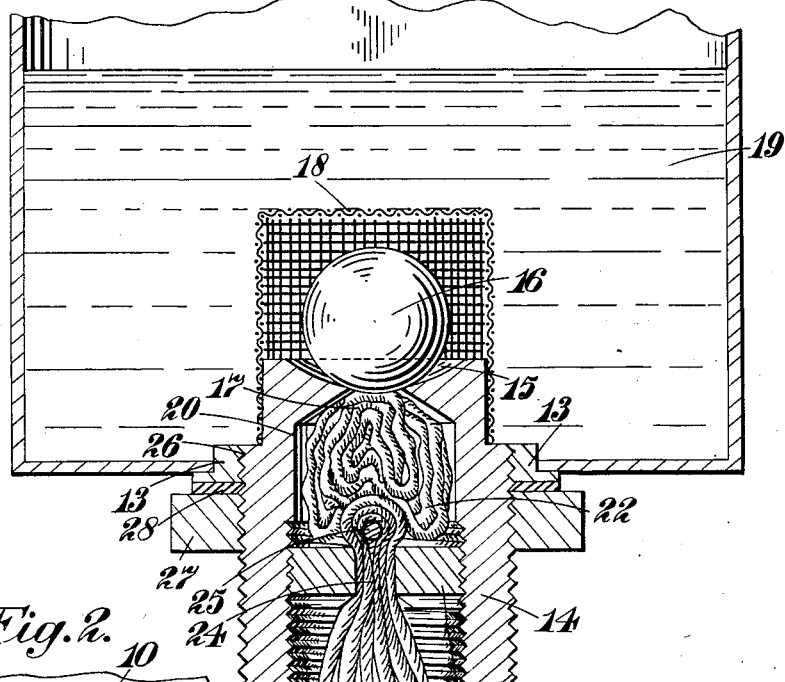
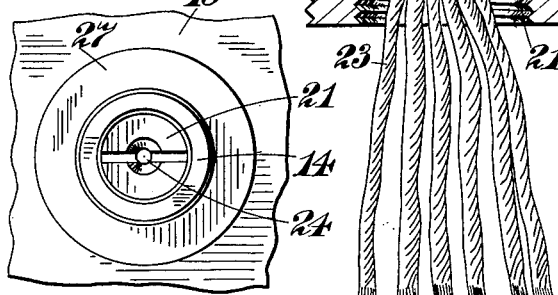
Inventor:
Edwin H. P. Young, Patented Nov. 6, 1934

1,980,128

UNITED STATES PATENT OFFICE 1,980,128

DRIP-FEED DEVICE

Edwin Henry Percy Young, London, England, assignor, by mesne assignments, to Shell Development Company, San Francisco, Calif., a corporation of Delaware Application September 21, 1931, Serial No. 564,232
In Great Britain September 20, 1930

1 Claim. (Cl. 184—69)

(Granted under the provisions of sec. 14, act of March 2, 1927; 357 O. G. 5)

This invention is for improvements in or relating to drip-feed devices, i. e. devices which feed liquid from the reservoir in drips. The invention has particular application to drip- and wick-feed lubricators.

Among the objects of the invention are generally to improve the construction of such devices and to make them more economical in use than they have hitherto been. When drip- or wick-feed lubricators are used on a vehicle, they are subject to the serious disadvantage that whether the vehicle is running or not, the bearings thereon are continually being lubricated. A further object of the present invention is to obviate this disadvantage.

According to the present invention, there is provided a drip-feed (e. g. wick-feed) device having a reservoir, whereof the outlet is controlled by a valve, the opening or closing of which is determined by the conditions under which, or in the neighbourhood of which the device is working.

According to a further feature of the invention, there is provided a drip-feed device wherein the valve is constituted by a ball seated on a concave surface whereby displacement of the ball, due to vibration, opens the outlet from the reservoir.

According to a further feature of the invention, a lubricating device comprises, in combination, a reservoir for lubricant, an outlet from the said reservoir, a valve controlling said outlet in accordance with the movements to which the device is subjected and a wick on the outlet side of the said valve for feeding lubricant. The outlet from the reservoir may communicate with an auxiliary chamber from which the wick is supplied with lubricant.

An embodiment of the invention is illustrated on the accompanying drawing, whereof—

Figure 1 is a sectional elevation of a wick-feed lubricator; and

Figure 2 is a partial plan looking on the underside of Figure 1, the wick being omitted.

The device shown in Figure 1 is adapted for use in a vehicle and for this purpose a lubricant-reservoir 10 has an inlet 11 by which it may be filled with a suitable lubricating oil. Lugs 12 serve for securing the reservoir to a stationary part of the vehicle in the neighbourhood of the part to be lubricated.

The outlet 13 from the reservoir is controlled by a valve which is influenced by vibration of the vehicle to shake it off its seat. For this purpose, a bush 14 is threaded in the outlet 13 and is provided on the part which projects into the reservoir with a concave seat 15 which directs a ball 16 over an outlet duct 17. The seat 14 is so shaped that it maintains the ball in such a position with respect to the duct that the latter is sealed when the ball is not being affected by vibration. A cage 18 constructed of wire gauze sweated or brazed on to the bush 14 covers the outlet duct 17 and filters the lubricant 19 before it passes through the outlet. On the outlet side of the ball valve an auxiliary chamber 20 is formed in the bush by the threaded plug 21 engaging the inner walls of the bush. In this auxiliary chamber a wick filling 22 is located which soaks up lubricant passing the outlet valve and delivers it to a number of yarns 23 which are in intimate contact with the filling 22. These yarns pass through a hole 24 in the plug 21 and are prevented from slipping out of the chamber 20 by a pin 25 which is of greater length than the diameter of the hole. The yarn 23 conducts the lubricant to the part which is to be lubricated by the device.

The bush 14 is secured in the reservoir 10 by threaded engagement with a collar 26 which is brazed in the outlet 13 of the reservoir. A locking ring 27 is threaded over the outside of the bush and locks it in any desired position in the reservoir. A gasket 28 is placed between the ring 27 and the collar 26 to prevent leakage of lubricant from the reservoir.

When the vehicle, on which the lubricator is mounted, is in motion the ball 16 is repeatedly shaken off its seat and lubricant is allowed to flow through the duct 17 into the chamber 20. From there it is conducted to the part to be lubricated by way of the yarn 23. By filling the chamber 20 with wick as shown, the possibility of a vacuum developing therein under certain weather conditions is avoided, so that in all cases the ball is affected by the vibration of the vehicle in motion.

The valve may comprise a roller or sliding valve co-operating with a suitably formed seat so that the roller is moved off its seat by vibration. A flat concave seat could be used instead of a concave spherical seat.

What I claim is:

A lubricating device comprising in combination a reservoir for lubricant, an outlet from the said reservoir, a valve controlling the said outlet in accordance with the movements to which the lubricator is subjected, an auxiliary wick-filled chamber on the outlet side of said valve, the bottom of said chamber being formed by a threaded plug engaging a threaded inner wall of the said chamber and a number of yarns passing through a hole in the said plug for conducting the lubricant away.

EDWIN HENRY PERCY YOUNG.